United States Patent [19]

Santoli

[11] Patent Number: 5,204,006
[45] Date of Patent: Apr. 20, 1993

[54] IN-LINE STATIC WATER CONDITIONER AND METHOD FOR INHIBITING SCALE FORMATION

[76] Inventor: Joseph P. Santoli, 2031 Discovery Circle, Pompano Beach, Fla. 33064

[21] Appl. No.: 839,029

[22] Filed: Feb. 18, 1992

Related U.S. Application Data

[63] Continuation of Ser. No. 567,594, Aug. 15, 1990, abandoned.

[51] Int. Cl.⁵ .............................................. C23F 13/00
[52] U.S. Cl. .................................... 210/696; 204/148; 204/197; 210/446; 210/501
[58] Field of Search ...................... 210/696, 198.1, 757, 210/501, 702, 435, 446; 204/148, 197, 150, 248; 252/175, 176

[56] References Cited

U.S. PATENT DOCUMENTS

| | | | |
|---|---|---|---|
| 3,448,034 | 6/1969 | Craft et al. | 204/197 |
| 3,486,999 | 12/1969 | Craft | 204/197 |
| 3,891,394 | 6/1975 | Smith et al. | 204/197 |
| 3,974,071 | 8/1976 | Dunn et al. | 210/696 |
| 4,606,828 | 8/1986 | Wells | 210/696 |
| 4,820,422 | 4/1989 | Spencer | 210/696 |
| 4,959,155 | 9/1990 | Gomez | 210/696 |

OTHER PUBLICATIONS

Care-Free Water Products advertisement, 1985.
Care-Free Conditioners Australia advertisement, circa 1988.
Corroscale Tool advertisement, pre Sep. 30, 1989.

*Primary Examiner*—Robert A. Dawson
*Assistant Examiner*—Sun Uk Kim
*Attorney, Agent, or Firm*—Harness, Dickey & Pierce

[57] ABSTRACT

An in-line static water conditioning device is provided for inhibiting scale formation in plumbing containing hard water. The water conditioning device is a housing containing a core to define a flow annulus. Water flowing through the annulus contacts the core surface comprising predominately copper and lesser amounts of tin, nickel and zinc to inhibit scale formation in the plumbing downstream of the device.

14 Claims, 1 Drawing Sheet

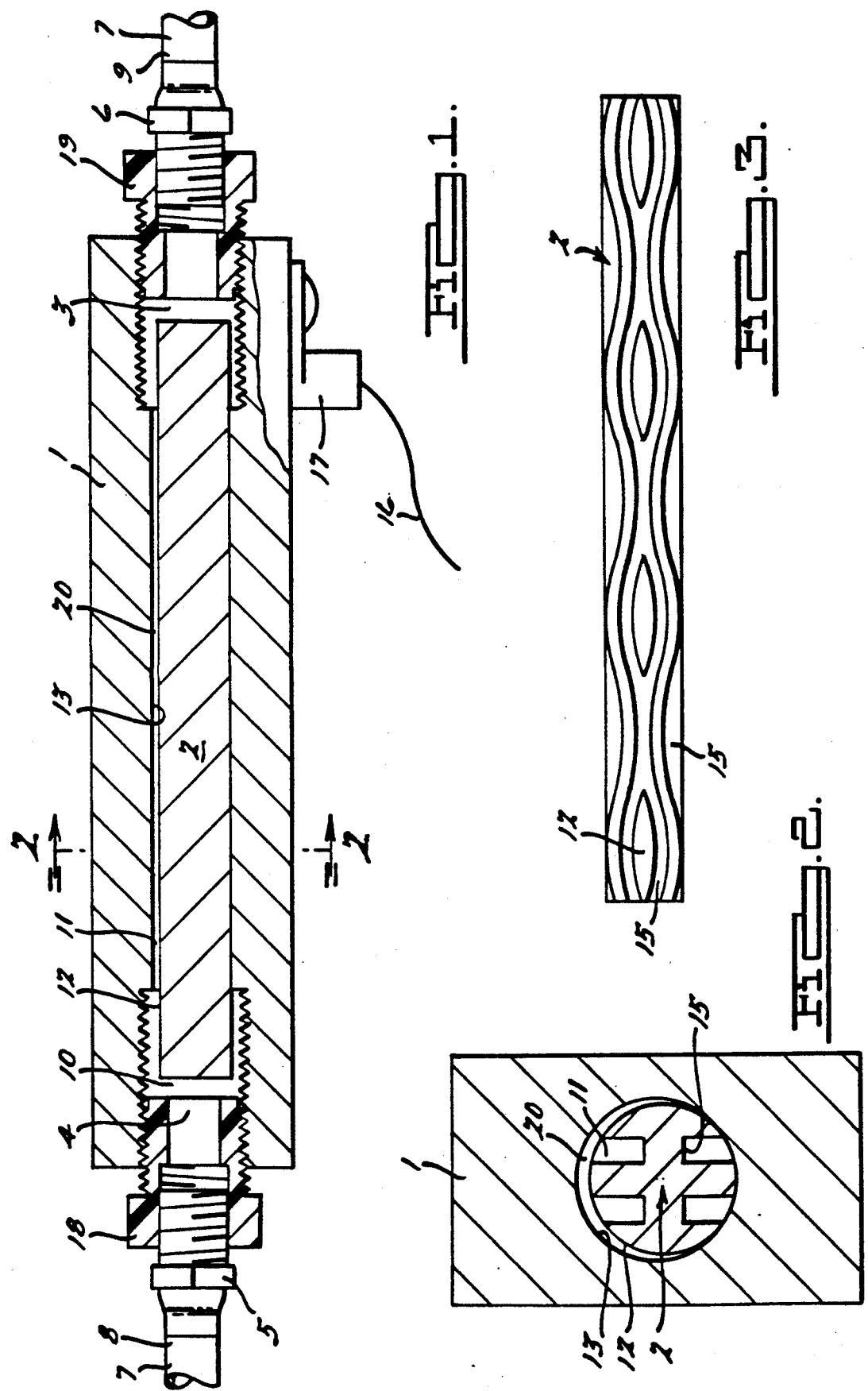

ompt# IN-LINE STATIC WATER CONDITIONER AND METHOD FOR INHIBITING SCALE FORMATION This is a continuation of patent application Ser. No. 567,594, filed Aug. 15, 1990, now abandoned.

BACKGROUND OF THE INVENTION

1. Technical Field

The present invention relates to a water conditioner and more specifically to a water conditioner for removing scale and preventing scale buildup in plumbing.

2. Background Information

Municipal and private potable water supplies throughout the United States are for the most part hard water. Hard water is characterized as water containing objectionable amounts of dissolved salts of calcium and magnesium, usually present as bicarbonates, chlorides or sulfates. Calcium sulfate, carbonate and silicate salts are particularly objectionable because of their scale forming nature in plumbing. Therefore, it is desirable to remove such dissolved salts from hard water.

Sodium cation exchange, termed water softening, is the most commonly used process for removing salts from hard water. In this process, calcium and magnesium ions in the hard water are exchanged for sodium ions in an exchange resin. The process requires relatively high capital investment for the ion exchange equipment and requires ongoing operating costs for a continuous supply of common salt to regenerate the exchange resin. Thus, the process is prohibitively expensive for many water softening applications.

Although some static water conditioners which avoid these costs are known, they have not been entirely satisfactory for removal and prevention of scale. As such, an effective water conditioner is needed for treating hard water. More particularly, a water conditioner is needed which requires relatively low capital and operating costs, yet which is specifically effective for the prevention and removal of scale formation in hard water.

SUMMARY OF THE INVENTION

The present invention satisfies the above-prescribed needs. The invention is a static in-line water conditioning device and its method of use. The device comprises a housing having an elongate internal chamber. An inlet port and an outlet port are provided in fluid communication with the chamber. A core is positioned within the chamber to define a flow annulus between the surface of the core and the chamber wall.

The housing is connected into a water pipeline at the inlet and outlet ports respectively such that water flowing through the pipeline must flow through the annulus. The surface of the core is provided with a plurality of longitudinal grooves which increase the core surface area. The grooves are patterned to agitate the water and enhance its contact with the core surface. The composition of the core surface is primarily copper with lesser amounts of nickel, tin and zinc.

Interaction between the water and the core results in a conditioned water which does not form scale in pipelines, fixtures and equipment downstream of the device and which removes preexisting scale therefrom. Many benefits are realized by the elimination of scale. In the absence of scale, the downstream pipeline supplies water to the ultimate downstream user at a relatively constant flow rate over a long period of time. The elimination of scale also extends the operable lifetime of downstream equipment while simultaneously reducing the frequency of maintenance required on such equipment. An incidental benefit of scale elimination is the improved taste of the treated water and improved performance of the treated water in certain processes, such as washing processes.

BRIEF DESCRIPTION OF THE DRAWINGS

FIG. 1 A cross-sectional side view of the device of the present invention installed in a pipeline.

FIG. 2 A side view of the core.

FIG. 3 A perpendicular cross-sectional view along line A—A of the device.

DESCRIPTION OF PREFERRED EMBODIMENT

The present invention is a water conditioning device which is described below with reference to FIGS. 1, 2 and 3. The device of FIG. 1 comprises a housing 1 having an elongate interior chamber 10 with a core 2 positioned therein. The housing 1 is provided with an outlet port 3 and an inlet port 4, both in fluid communication with the chamber. The inlet port 4 is provided with a fitting 5 for sealably connecting the housing 1 to a water pipeline 7. The outlet port 3 is likewise provided with a fitting 6 for sealably connecting the housing 1 to the water pipeline 7. The fittings 5 and 6 may be made of brass or some other material compatible with the pipeline 7 which is typically copper.

The present device is installed in the pipeline 7 which typically provides water from a water source to a water user. The water user is oftentimes a residence or simply a water using piece of equipment such as an ice maker, dishwasher, water cooler, or the like. The device is installed in-line at an opening in the pipeline 7 by sealably connecting the inlet fitting 5 to the pipe end 8 nearest the water source while sealably connecting the outlet fitting 6 to the pipe end 9 nearest the water user. Installation of the device in the pipeline 7 provides a continuous water flow path from the water source to the water user, with the water passing through the pipeline 7 and the water conditioning device en route to the water user.

The elongate interior chamber 10 encloses the core 2 statically positioned therein. The core is sized slightly smaller than the chamber 10 to fit closely within the chamber 10, yet provide a narrow fluid flow annulus 11 between the surface of the core 12 and the chamber wall 13. In the present embodiment, the core 2 sits freely on the floor of the chamber 10 such that the core 2 and chamber 10 are not concentric resulting in an irregular flow annulus 11. It is also possible to attach the core 2 to the housing 1 in a manner known to one skilled in the art such that the core 2 is concentrically suspended in the chamber 10 to form a uniform flow annulus.

The core surface 12 preferably is provided with a plurality of longitudinal grooves 15 formed therein. The grooves 15 are most preferably provided in a tortuous pattern to define a plurality of tortuous flow paths through the annulus 11. In the present embodiment, as shown in FIGS. 2 and 3, the grooves define wave-shaped flow paths, but other configurations of grooves are possible which perform the desired function.

The grooves 15 agitate the water as it flows through the annulus 11 past the core surface 12 and provide an increased core surface area to facilitate contact between the water and the core surface 12. The grooves 15 also discharge an agitated flow from the outlet port 3 of the device which is desirable for reasons set forth below.

The greatest annular distance 20 between the chamber wall 13 and the ungrooved portion of the core surface 12 is typically about 0.1 mm to about 2 mm. The depth of the grooves 15 is preferably less than the radius of the core 2. The depth is typically as much as 50% to 90% of the core radius.

The composition of the core 2 is such that it preferably has a copper weight fraction greater than 0.8 and a lead weight fraction less than 0.005, with the remainder of the core 2 made up of tin, nickel and zinc. Preferably, the weight fraction of tin and nickel is between 0.07 and 0.04 and the weight fraction of zinc is between 0.04 and 0.01.

A most preferred composition range for the core 2 is as follows:

|  | Weight Fraction |
| --- | --- |
| Copper | >0.85 |
| Tin | 0.06–0.05 |
| Nickel | 0.05–0.04 |
| Zinc | 0.03–0.02 |
| Lead | 0.002–0 |

Incidental amounts of other elements may be present in the core, but are not necessary to the practice of the present invention.

The core composition recited above has been found particularly effective both for the removal of scale already present in the pipeline 7 or equipment downstream of the device and for the prevention of scale buildup downstream of the device. The effectiveness of the core 2 is attributable to the specific combination of metals making up the core and particularly to the high proportion of copper in conjunction with the lesser remaining proportions of tin, nickel and zinc in the core. The tin and nickel beneficially resist corrosion and erosion to extend the core lifetime. A minimal or nonexistent lead fraction in the core 2 minimizes the leaching of lead into the conditioned water, thereby reducing the health risk from lead in the conditioned water. The core composition is also highly electrically conductive which is beneficial for reasons set forth below.

The housing 1 of the device may consist of any electrically conductive material which is preferably not reactive with the core 2. In the preferred embodiment, the housing 1 is composed of the same material as the core z so that the water flowing through the annulus 11 also contacts the scale preventing composition at the chamber walls 13.

Performance of the device is inter alia a function of the water flow rate through the device. Although the device is operable at virtually any practical flow rate, it is preferably operated within a flow rate range up to about 10 gallons per minute (GPM) and more preferably between about 3 and about 6 GPM at a water pressure of 60 psia. The flow rate through the device can be adjusted for a given water pressure by varying the diameter of the fittings 5 and 6. For example, a ¼ inch diameter fitting feeding into a ½ inch diameter chamber 10 at 60 psia results in a flow rate of about 3 GPM, while a ½ inch diameter fitting feeding into a ½ inch diameter chamber 10 at 60 psia results in a flow rate of about 6 GPM.

It is preferable to design the chamber cross-sectional diameter relatively small; i.e., less than 1 inch, so that relatively high flow rates can be maintained even at low water throughputs in the pipeline 7. If the flow rate in the device drops below the preferred ranges recited above, there is less agitation of the water and the effectiveness of the device may diminish. If the pipeline throughput is beyond the capacity of a single device, increased capacity can be achieved by placing two or more devices of the same size in parallel, as necessary, and connecting them to the pipeline via manifolds.

The device is dimensionally scaled such that the length of the chamber 10 is substantially greater than the cross-sectional diameter of the chamber 10. Preferably the length to diameter ratio is between about 20:1 and about 5:1 and most preferably between about 15:1 and about 10:1. For example, a preferred length of the chambers 10:5 about 6 inches and a preferred diameter is about ½ inches which results in a ratio of 12:1.

The device is further provided with an electrical ground connection. The ground connection is in electrically conductive communication between the device and an isolated earth ground. The ground connection shown in FIG. 1 is a copper cable 16 attached to a terminal 7 (termed a lug) on the housing 1. The cable 16 leads to an isolated earth ground not shown. The core 2 is in direct contact with the housing 1 and both preferably consist of the composition described above. Thus, any electrical charges building up in the housing 1 or core 2 as the result of flow through the device, are conducted to the ground connection and immediately dissipated to the earth ground.

Where the pipeline 7 or the fittings 5 and 6 are conductive, it is preferable to electrically and chemically isolate them from the core 2 and the housing 1. This can be achieved by providing dielectric insulators 18 and 19 between the fittings 5 and 6 and the housing 1. The dielectric insulators 18 and 19 are preferably made of an insulative and chemically inert material such as polyvinyl chloride or a similar plastic.

It is believed that the present water conditioning device operates according to the following theories, although the invention is not limited to such theories. The formation of scale deposits from dissolved calcium salts occurs when small seed crystals attach to a plumbing surface providing a site for scale formation. The core surface of the present device has a composition and surface chemistry which acts as a preferential site for the formation of seed crystals from calcium salts. Thus, seed crystals form on the core surface, which is placed in-line ahead of the plumbing desired to be protected.

Once a seed crystal is formed on the core surface, it continues to grow until it is dislodged by the flow of water through the flow annulus which may be enhanced by agitation. The size of the dislodged seed crystal is too large to attach to the surface of any downstream plumbing, yet not too large to flow harmlessly through the downstream plumbing. As a result, scale deposition is avoided in the plumbing. Plumbing is broadly defined herein to include pipelines, fixtures and water using equipment.

Seed crystal formation in the device is facilitated by other mechanisms in addition to the core composition. The calcium salts in solution carry an ionic charge and, as the water flows through the device, a static charge is also created in the device. This static charge is dissipated to the ground by the ground connection. The net effect of these electrical charges further enhances seed crystal formation on the core.

The agitation created by the grooves improves water contact with the core surface. This increases the contact time between the dissolved calcium salts and the core, thereby optimizing the formation of seed crystals on the core surface. Agitation also drives carbon dioxide dissolved in the water out of solution. The resulting carbon dioxide dissolves preexisting scale buildup which exists in the plumbing downstream of the device. The agitated flow of water out of the device also physically dislodges preexisting scale from downstream plumbing and facilitate its removal.

While the foregoing preferred embodiments of the invention have been described and shown, it is understood that alternatives and modifications, such as those suggested and others may be made thereto and fall within the scope of the invention.

I claim:

1. A water conditioning device for inhibit scale formation comprising:
   a housing having an inlet port, an outlet port, and a chamber providing fluid communication between said inlet port and said outlet port; and
   a core having a surface, said core enclosed within said chamber having a wall, wherein said core surface and said chamber wall define a fluid flow annulus through said housing from said inlet port to said outlet port, and further wherein said core surface has a composition comprising copper having a weight fraction greater than 0.8, lead having a weight fraction between 0.005 and 0, tin and nickel having a weight fraction between 0.07 and 0.04, and zinc having a weight fraction between 0.04 and 0.01.

2. The device of claim 1 wherein the copper weight fraction is greater than 0.85 and the lead weight fraction is between 0.002 and 0.

3. The device of claim 1 wherein the tin weight fraction is between 0.06 and 0.05, the nickel weight fraction is between 0.05 and 0.04, and the zinc weight fraction is between 0.03 and 0.02.

4. The device of claim 1 further comprising a ground means in electrical communication with said core and an isolated earth ground.

5. The device of claim 1 wherein said chamber has a length to cross-sectional diameter ratio between about 10:1 and about 5:1.

6. The device of claim 1 further comprising a plurality of longitudinal grooves formed in said core surface.

7. The device of claim 6 wherein said plurality of grooves define a wave-shaped pattern in said core surface.

8. The device of claim 1 wherein said chamber wall has the composition of said core.

9. A method for inhibiting scale formation in plumbing comprising contacting water containing scale forming ions with a surface having a composition comprising copper having a weight fraction greater than 0.8, tin and nickel having a weight fraction between 0.07 and 0.04, zinc having a weight fraction between 0.04 and 0.01 and lead having a weight fraction between 0 and 0.005 by flowing said water across said surface before feeding said water to said plumbing.

10. The method of claim 9 wherein the tin weight fraction is between 0.06 and 0.05, the nickel weight fraction is between 0.05 and 0.04, and the zinc weight fraction is between 0.03 and 0.02.

11. The method of claim 9 wherein the copper weight fraction is greater than 0.85 and the lead weight fraction is between 0.002 and 0.

12. The method of claim 9 further comprising electrically grounding said surface.

13. The method of claim 9 further comprising agitating the water flowing across said surface by providing irregularities in said surface.

14. The method of claim 13 wherein said irregularities are a plurality of longitudinal grooves in said surface.

* * * * *